US012563153B2

(12) United States Patent
Xu

(10) Patent No.: US 12,563,153 B2
(45) Date of Patent: Feb. 24, 2026

(54) DATA PROCESSING METHOD AND APPARATUS, AND ELECTRONIC DEVICE

(71) Applicant: VIVO MOBILE COMMUNICATION CO., LTD., Guangdong (CN)

(72) Inventor: Huicong Xu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 408 days.

(21) Appl. No.: 18/174,347

(22) Filed: Feb. 24, 2023

(65) Prior Publication Data

US 2023/0214963 A1 Jul. 6, 2023

Related U.S. Application Data

(63) Continuation of application No. PCT/CN2021/114393, filed on Aug. 24, 2021.

(30) Foreign Application Priority Data

Aug. 31, 2020 (CN) .......................... 202010893667.4

(51) Int. Cl.
*H04N 5/265* (2006.01)
*G06T 5/50* (2006.01)
(52) U.S. Cl.
CPC .............. *H04N 5/265* (2013.01); *G06T 5/50* (2013.01); *G06T 2207/10024* (2013.01)
(58) Field of Classification Search
CPC .... G06T 5/00; G06T 5/50; G06T 2207/10024
See application file for complete search history.

(56) References Cited

U.S. PATENT DOCUMENTS

| | | | | |
|---|---|---|---|---|
| 2015/0138237 A1* | 5/2015 | Ghosh | ...................... | G09G 5/36 |
| | | | | 345/634 |
| 2018/0255264 A1* | 9/2018 | Kwon | .................... | H04N 21/47 |
| 2020/0036983 A1 | 1/2020 | Wang et al. | | |
| 2020/0267363 A1* | 8/2020 | Chen | ...................... | G09G 5/028 |

FOREIGN PATENT DOCUMENTS

| | | |
|---|---|---|
| CN | 107958449 A | 4/2018 |
| CN | 108198161 A | 6/2018 |
| CN | 108781218 A | 11/2018 |
| CN | 110609669 A | 12/2019 |

(Continued)

OTHER PUBLICATIONS

Extended European Search Report regarding European Patent Application No. 21860407.2, dated Dec. 20, 2023.

(Continued)

*Primary Examiner* — George Eng
(74) *Attorney, Agent, or Firm* — Harness, Dickey & Pierce, P.L.C.

(57) ABSTRACT

A data processing method includes: receiving, through a display interface, first image data in an RGB format sent by a data transmit terminal, where the first image data is image data obtained after image blending is performed on ARGB data of a target image and image data of a preset background image, and the display interface is used to receive data in an RGB format; and performing data restoration processing on the first image data to obtain the ARGB data of the target image.

20 Claims, 7 Drawing Sheets

(56) References Cited

FOREIGN PATENT DOCUMENTS

| | | | |
|---|---|---|---|
| CN | 112037291 A | 12/2020 | |
| WO | WO-2017206400 A1 | 12/2017 | |

OTHER PUBLICATIONS

First Office Action regarding Chinese Patent Application No. 202010893667.4, dated Jul. 29, 2023. Translation provided by Bohui Intellectual Property.

International Search Report and Written Opinion of the International Searching Authority regarding International Patent Application No. PCT/CN2021/114393, dated Nov. 24, 2021. Translation provided by Bohui Intellectual Property.

* cited by examiner

| Cr3 | Cr4 | Cr3 | Cr4 | Cr3 | Cr4 |
| Cr4 | Cr3 | Cr4 | Cr3 | Cr4 | Cr3 |
| Cr3 | Cr4 | Cr3 | Cr4 | Cr3 | Cr4 |
| Cr4 | Cr3 | Cr4 | Cr3 | Cr4 | Cr3 |
| Cr3 | Cr4 | Cr3 | Cr4 | Cr3 | Cr4 |
| Cr4 | Cr3 | Cr4 | Cr3 | Cr4 | Cr3 |
| Cr3 | Cr4 | Cr3 | Cr4 | Cr3 | Cr4 |
| Cr4 | Cr3 | Cr4 | Cr3 | Cr4 | Cr3 |
| Cr3 | Cr4 | Cr3 | Cr4 | Cr3 | Cr4 |

DATA PROCESSING METHOD AND APPARATUS, AND ELECTRONIC DEVICE

CROSS-REFERENCE TO RELATED APPLICATIONS

This application is a Bypass Continuation Application of PCT/CN2021/114393, filed on Aug. 24, 2021, which claims priority to Chinese Patent Application No. 202010893667.4, filed on Aug. 31, 2020, which are incorporated herein by reference in their entirety.

TECHNICAL FIELD

This disclosure pertains to the field of data processing technologies, and relates to a data processing method and apparatus, and an electronic device.

BACKGROUND

Display interfaces include a "display transmit interface" and a "display receive interface". Common display interfaces include interfaces such as a display serial interface (DSI), a display port (DP), a high-definition multimedia interface (HDMI), an embedded display port (EDP), a digital visual interface (DVI), and a video graphics array (VGA). For example, the DSI is a serial interface for transmitting display data, and is widely used in a display device (such as a mobile phone or a smart watch) with a liquid crystal display (LCD), and supports transmission of RGB data.

Currently, many display interfaces such as the DSI cannot transmit ARGB data, and consequently a data receive terminal cannot receive data in an ARGB format.

SUMMARY

Embodiments of this disclosure aim to provide a data processing method and apparatus, and an electronic device.

According to a first aspect, an embodiment of this disclosure provides a data processing method, including:

receiving, through a display interface, first image data in an RGB format sent by a data transmit terminal, where the first image data is image data obtained after image blending is performed on ARGB data of a target image and image data of a preset background image, and the display interface is used to receive data in an RGB format; and performing data restoration processing on the first image data to obtain the ARGB data of the target image.

According to a second aspect, an embodiment of this disclosure provides a data processing apparatus, including:

a first image data obtaining module, configured to receive, through a display interface, first image data in an RGB format sent by a data transmit terminal, where the first image data is image data obtained after image blending is performed on ARGB data of a target image and image data of a preset background image, and the display interface is used to receive data in an RGB format; and a restoration module, configured to perform data restoration processing on the first image data to obtain the ARGB data of the target image.

According to a third aspect, an embodiment of this disclosure provides an electronic device. The electronic device includes a processor, a memory, and a program or an instruction that is stored in the memory and executable on the processor, where when the program or the instruction is executed by the processor, the steps of the method in the first aspect are implemented.

According to a fourth aspect, an embodiment of this disclosure provides a non-transitory readable storage medium. The non-transitory readable storage medium stores a program or an instruction, and when the program or the instruction is executed by a processor, the steps of the method in the first aspect are implemented.

According to a fifth aspect, an embodiment of this disclosure provides a chip. The chip includes a processor and a communications interface, the communications interface is coupled to the processor, and the processor is configured to execute a program or an instruction to implement the method in the first aspect.

BRIEF DESCRIPTION OF DRAWINGS

FIG. 7 is a schematic diagram of a third hybrid image according to this disclosure;

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

In the specification and claims of this disclosure, the terms "first", "second", and the like are intended to distinguish between similar objects but do not describe a specific order or sequence. It should be understood that the data used in such a way is interchangeable in proper circumstances so that the embodiments of this disclosure can be implemented in an order other than the order illustrated or described herein. In addition, objects distinguished by "first", "second", and the like are generally of one type, and a quantity of objects is not limited. For example, a first object may be one object, or may be a plurality of objects. In addition, in the specification and the claims, "and/or" represents at least one of connected objects, and a character "/" generally represents an "or" relationship between associated objects.

With reference to the accompanying drawings, the data processing method and apparatus, the electronic device, and the medium provided in the embodiments of this disclosure are described in detail by using embodiments and application scenarios.

Figure 1:
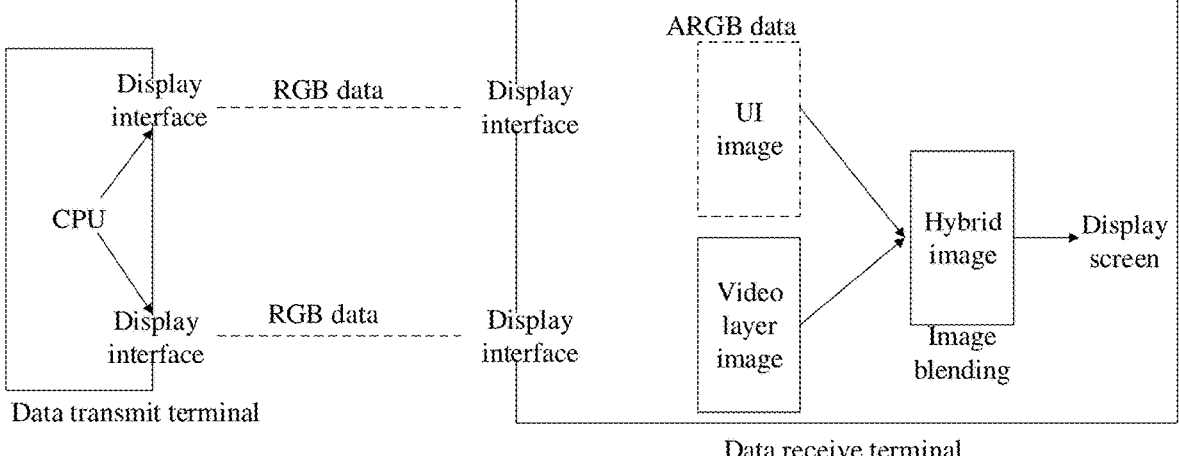
FIG. 1 is a schematic scenario diagram of data processing according to an embodiment of the present disclosure.

In some actual scenarios, an image receive terminal needs to perform image blending, and image data in an ARGB format is required when image blending is performed. FIG. 1 is a schematic scenario diagram of a data processing system according to this disclosure. In a scenario shown in FIG. 1, a data receive terminal (for example, a display apparatus of an electronic device) needs to perform image blending on pure video data without a user interface (UI) with a UI image for image enhancement, and then send a hybrid image to a display screen for display.

During image blending, the UI image is used as a foreground image above, and video layer image is used as a background image below. Therefore, image data of the UI image needs to be data in an ARGB format. However, a display transmit interface of a data transmit terminal can only send data in an RGB format, and cannot send the UI image in an ARGB format. In addition, a display interface of the data receive terminal cannot receive image data in an ARGB format either. Therefore, the data receive terminal cannot obtain image data in an ARGB format.

To resolve the foregoing problem, this disclosure provides a data processing method and apparatus, a device, and a medium. When a data transmit terminal needs to send data in an ARGB format, the data in an ARGB format is blended with image data of a preset background image to obtain data in an RGB format, and the data transmit terminal sends the data in an RGB format through a display transmit interface such as a DSI. After receiving the data in an RGB format, a display interface of a data receive terminal restores the data in an RGB format to the data in an ARGB format, so that the data receive terminal whose display interface can only receive the data in an RGB format can obtain the data in an ARGB format.

Figure 2:
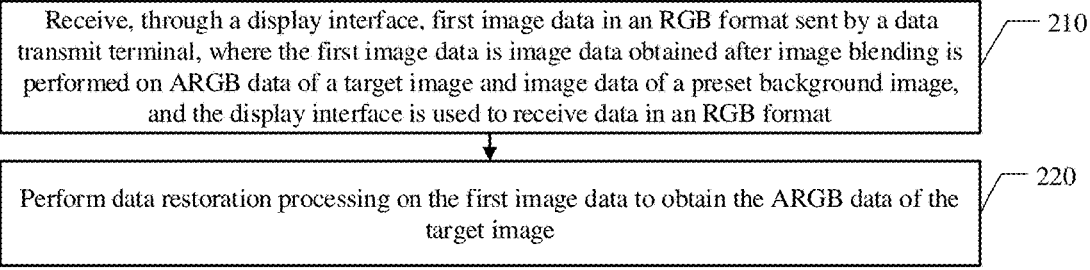
FIG. 2 is a schematic flowchart of a first embodiment of a data processing method according to this disclosure.

FIG. 2 is a schematic flowchart of a first embodiment of a data processing method according to this disclosure. As shown in FIG. 2, a data processing method 200 provided in this disclosure includes step 210 and step 220.

Step 210: receive, through a display interface, first image data in an RGB format sent by a data transmit terminal, where the first image data is image data obtained after image blending is performed on ARGB data of a target image and image data of a preset background image, and the display interface is used to receive data in an RGB format.

In this embodiment of this disclosure, an image blender may be used to perform image blending on two images in an ARGB format. One image in an ARGB format is used as a foreground image, and the other image in an ARGB format is used as a background image. The image blender may obtain an RGB value of each pixel in a hybrid image based on an ARGB value of the foreground image, an ARGB value of the background image, and a preset blending algorithm.

In an example, the preset blending algorithm may be represented by using the following expression:

$$Cr=a\times Cf+(1-a)\times Cb \qquad (1)$$

Cf is a color value of a target color of a pixel Q in the foreground image, Cb is a color value of a target color of a pixel that is in the background image and that is at the same pixel position as the pixel Q in the foreground image, Cr is a color value of a target color of a pixel that is in the hybrid image and that is at the same pixel position as the pixel Q in the foreground image, and a is a ratio of an Alpha value (Af) of the pixel Q in the foreground image to a preset color depth. The target color may be red (R), green (G), or blue (B). Therefore, an RGB value of each pixel in the hybrid image may be obtained by using the foregoing blending algorithm, where the preset color depth is determined based on the number n of bits of the preset color depth, and n is a positive integer. For example, if n=8, the color depth is 255.

Figure 3:
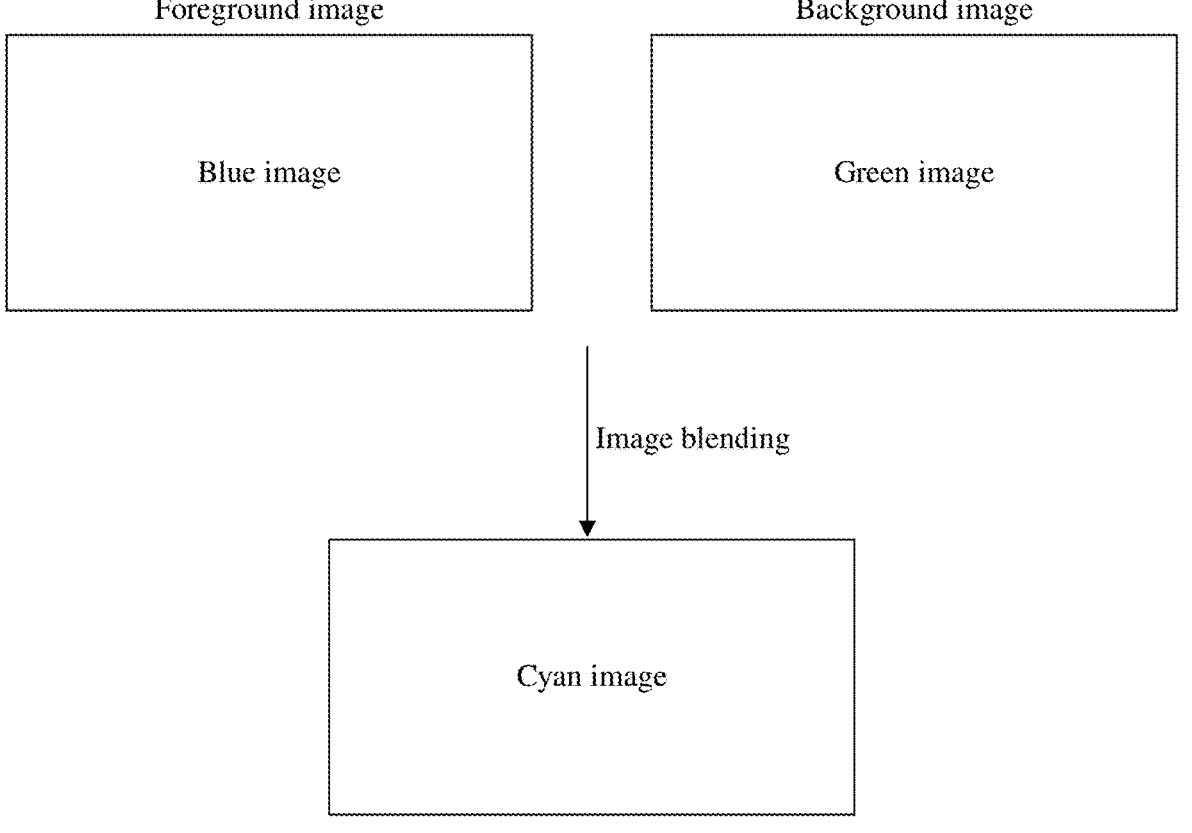
FIG. 3 is a schematic diagram of image mixing according to this disclosure.

FIG. 3 is a schematic diagram of a hybrid image according to this disclosure. Referring to FIG. 3, the foreground image is a blue image, the background image is a green image, and it can be seen that the hybrid image is a cyan image.

Step 220: perform data restoration processing on the first image data to obtain the ARGB data of the target image.

In this embodiment of this disclosure, because the first image data in an RGB format includes image data information of the target image, after receiving the first image data in an RGB format through the display interface such as a DSI, the data receive terminal may restore the ARGB data of the target image from the first image data by using a restoration algorithm corresponding to the preset blending algorithm.

Figure 4:
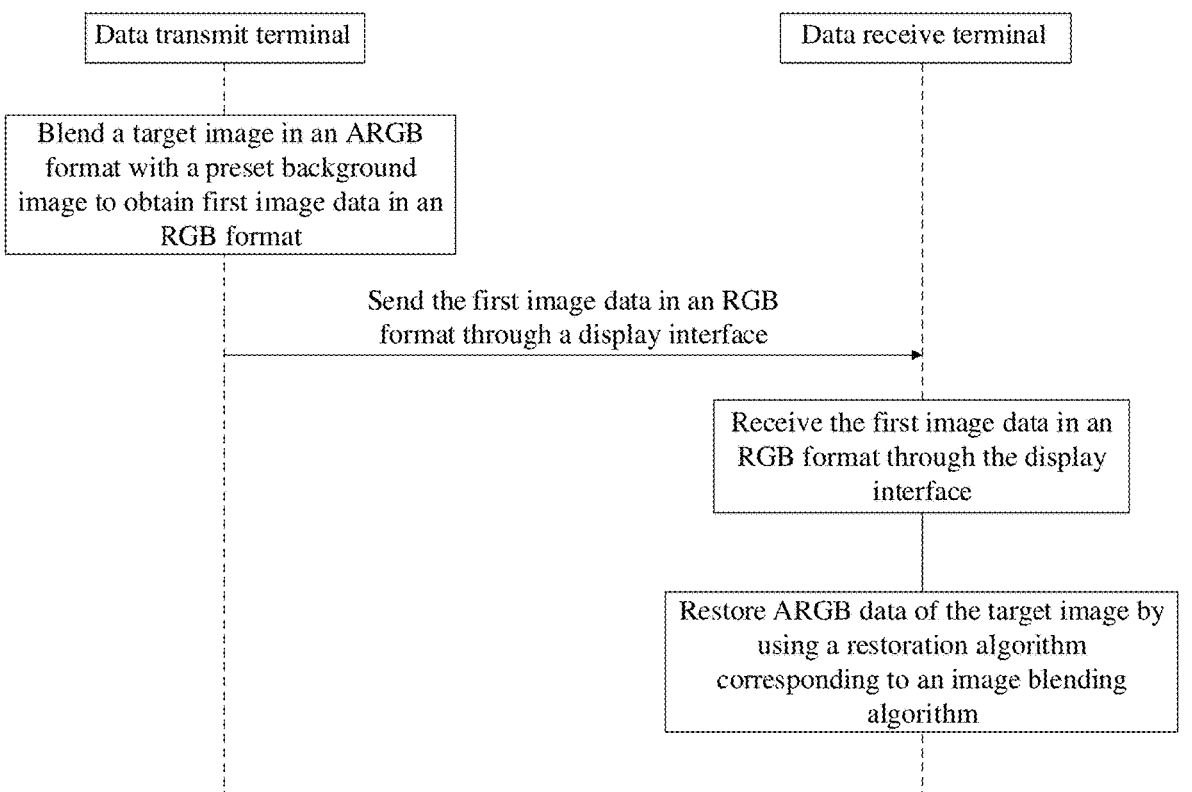
FIG. 4 is a schematic flowchart of a second embodiment of a data processing method according to this disclosure.

FIG. 4 is a schematic flowchart of a second embodiment of a data processing method according to this disclosure. As shown in FIG. 4, a data transmit terminal performs image blending on a target image in an ARGB format and a preset background image to obtain first image data in an RGB format. The data transmit terminal sends the first image data to a display interface of a data receive terminal through a display interface of the data transmit terminal. Then, the data receive terminal receives, through the display interface, the first image data in an RGB format sent by the data transmit terminal, and restores ARGB data of the target image by using a restoration algorithm corresponding to an image blending algorithm.

In this embodiment of this disclosure, a display interface of a data receive terminal can only transmit data in an RGB format. To ensure that the data receive terminal can obtain ARGB data of a target image, a data transmit terminal needs to blend the ARGB data that is of the target image and that needs to be transmitted with image data of a preset background image in advance to obtain first image data in an RGB format. The display interface of the data receive terminal may receive the first image data in an RGB format sent by the data transmit terminal. Because the first image data includes image data information of the target image, the data receive terminal may obtain the ARGB data of the target image by performing data restoration processing on the first image data, so that data in an ARGB format can be transmitted.

In some embodiments of this disclosure, the preset background image includes a first preset image and a second preset image, an RGB value of each pixel in the first preset image is a first preset value, an RGB value of each pixel in the second preset image is a second preset value, and the second preset value is determined based on the number of bits of a preset color depth.

The first image data includes an RGB value of each first pixel in a first hybrid image and an RGB value of each second pixel in a second hybrid image; and the first hybrid image is an image obtained after image blending is performed on the target image and the first preset image, and the second hybrid image is an image obtained after image blending is performed on the target image and the second preset image.

In this embodiment of this disclosure, the first preset image and the second preset image are separately blended with the target image, and the ARGB value of the pixel that is in the target image and that is at the corresponding position of the first pixel may be accurately restored with reference to the RGB value of the first pixel and the RGB value of the second pixel at the corresponding position of the first pixel, thereby improving accuracy of restoring data of the target image.

In an example, the first preset value is 0, that is, the first preset image is a pure black image whose RGB value of each first pixel is 0. In an example, the second preset value is 2n−1, where n is the number of bits of the preset color depth. For example, if the number of bits of the preset color depth is 8, the second preset value is 255. That is, an RGB value of each second pixel in the second preset image is 255, and the second preset image is a pure white image with a maximum color depth.

In an example, the data transmit terminal uses the target image as a foreground image, uses a pure black image (that is, the first preset image) as a background image, and performs image blending on the target image and the pure black image by using the preset blending algorithm to obtain the RGB value of each first pixel in the first hybrid image, that is, image data of the first hybrid image.

In some embodiments, the RGB value of the first pixel in the first hybrid image is data obtained after weighted summation is performed on an RGB value of a first target pixel in the target image and an RGB value of a second target pixel in the first preset image based on a first ratio.

The first target pixel is a pixel that is in the target image and that is at a corresponding position of the first pixel, and the second target pixel is a pixel that is in the first preset image and that is at a corresponding position of the first target pixel. The first ratio is a ratio of a transparency of the first target pixel to the preset color depth.

In an example, the first target pixel is a pixel that is in the target image and that is at the same pixel position as the first pixel, the second target pixel is a pixel that is in the first preset image and that is at the same pixel position as the first target pixel, and the third target pixel is a pixel that is in the second preset image and that is at the same pixel position as the first target pixel.

In some embodiments, the data transmit terminal uses the target image in an ARGB format as a foreground image, uses the first preset image as a background image, and performs image blending on the target image and the first preset image by using the expression (1) to obtain the first hybrid image.

For example, the first preset image is a pure black image, and an RGB value of each pixel in the first preset image is 0. Referring to the expression (1), because Cb=0, the following may be obtained:

$$Cr1 = a1 \times Cf1 \tag{2}$$

Cr1 is a color value of a target color of the first pixel in the first hybrid image, Cf1 is a color value of a target color of the first target pixel in the target image, and a1 is a ratio of a transparency Af1 of the first target pixel to the preset color depth. The target color may be red (R), green (G), or blue (B). The RGB value of each first pixel in the first hybrid image may be obtained by using the expression (2).

Figure 5:
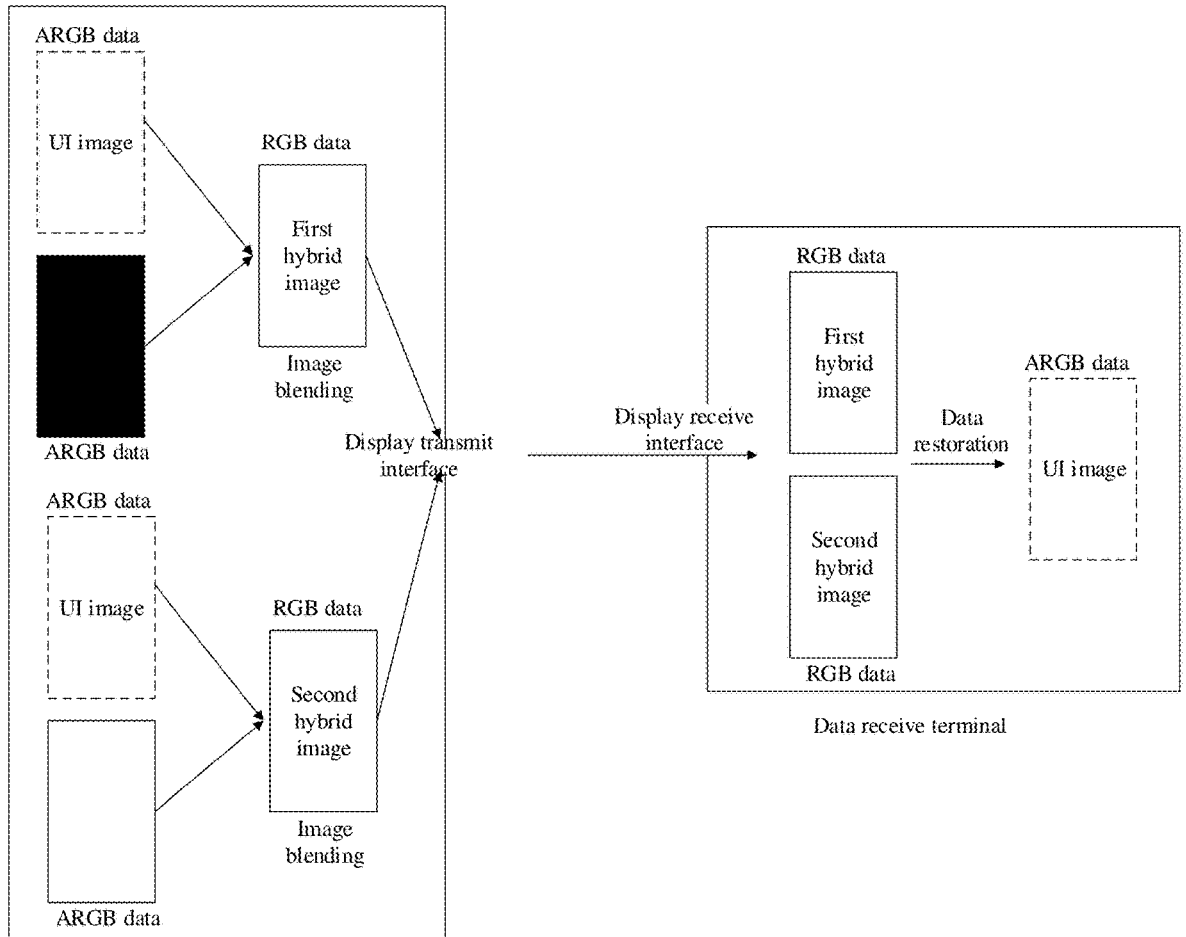
FIG. 5 is a schematic flowchart of a third embodiment of a data processing method according to this disclosure.

FIG. 5 is a schematic diagram of a third embodiment of a data processing method according to this disclosure. As shown in FIG. 5, the data transmit terminal blends the ARGB data of the target image with RGB data of a pure black image to obtain the RGB value of each first pixel in the first hybrid image. The data transmit terminal sends the RGB value of each first pixel in the first hybrid image in an RGB format to the data receive terminal through a display transmit interface. The data receive terminal receives the RGB value of each first pixel in the first hybrid image through a display receive interface.

In an example, the data transmit terminal uses the target image as a foreground image, uses a pure white image (the second preset image) as a background image, and performs image blending on the target image and the pure white image by using the preset blending algorithm to obtain the RGB value of each second pixel in the second hybrid image, that is, image data of the second hybrid image.

In some embodiments, the RGB value of the second pixel that is in the second hybrid image and that corresponds to the first pixel is data obtained after weighted summation is performed on the RGB value of the first target pixel and an RGB value of a third target pixel in the second preset image based on the first ratio. The third target pixel is a pixel that is in the second preset image and that is at a corresponding position of the first target pixel.

In some embodiments, the data transmit terminal uses the target image in an ARGB format as a foreground image, uses the second preset image as a background image, and performs image blending on the target image and the second preset image by using the expression (1) to obtain the second hybrid image.

For example, the second preset image is a pure white image, and the RGB value of each pixel in the second preset image is determined according to the preset color depth. That is, Cb=2n−1, where n is the number of bits of the preset color depth. For example, if the number of bits of the color depth is 8, Cb=255. Referring to the expression (1), the following may be obtained:

$$Cr2 = a1 \times Cf1 + (1−a1) \times 255 \tag{3}$$

Cr2 is a color value of a target color of the second pixel that is in the second hybrid image and that is at a corresponding position of the first pixel. The target color may be red (R), green (G), or blue (B). The RGB value of each second pixel in the second hybrid image may be obtained by using the expression (2).

Still referring to FIG. 5, the data transmit terminal blends the ARGB data of the target image with RGB data of a pure white image to obtain the RGB value of each second pixel in the second hybrid image. The data transmit terminal sends the RGB value of each second pixel in the second hybrid image in an RGB format to the data receive terminal through a display transmit interface. The data transmit terminal sends the RGB value of each second pixel in the second hybrid image in an RGB format to the data receive terminal through a display transmit interface. The data receive terminal receives the RGB value of each second pixel in the second hybrid image through a display receive interface.

That is, the data transmit terminal transmits the RGB value of each first pixel in the first hybrid image and the RGB value of each second pixel in the second hybrid image to the data receive terminal through the display interface. The data receive terminal may receive the first image data in an RGB format through the display receive interface, that is, receive the RGB value of each first pixel in the first hybrid image and the RGB value of each second pixel in the second hybrid image.

In this embodiment of this disclosure, weighted summation is performed on the RGB value of the first target pixel in the target image and the RGB value of the second target pixel in the first preset image by using the first ratio, so as to perform image blending on the first preset image and the target image, and weighted summation is performed on the RGB value of the first target pixel and the RGB value of the third target pixel in the second preset image by using the first ratio, so as to perform image blending on the second preset image and the target image. This blending manner has high versatility, which can save calculation resources and interfaces resources, and simplify transmission of ARGB data.

In a case that the first image data includes the RGB value of each first pixel in the first hybrid image and the RGB value of each second pixel in the second hybrid image, step 220 includes: calculating, for each first pixel based on the RGB value of the first pixel and the RGB value of the second pixel at the corresponding position of the first pixel, an ARGB value of a pixel that is in the target image and that is at a corresponding position of the first pixel.

It should be noted that the second pixel at the corresponding position of the first pixel is the second pixel that is in the second hybrid image and that is at the same pixel position as the first pixel. The pixel that is in the target image and that is at a corresponding position of the first pixel is a pixel that is in the target image and that is at the same pixel position as the first pixel.

In this embodiment of this disclosure, the first preset image and the second preset image are separately blended with the target image, and the ARGB value of the pixel that is in the target image and that corresponds to the first pixel may be accurately restored with reference to the RGB value of the first pixel and the RGB value of the second pixel at the corresponding position of the first pixel, thereby improving accuracy of restoring data of the target image.

In some embodiments, in step 220, a first parameter is first obtained based on the RGB value of the first pixel, the RGB value of the second pixel at the corresponding position of the first pixel, and the second preset value.

In some embodiments of this disclosure, the first parameter is the restored first ratio. For example, if the first preset value is 0 and the second preset value is 255, an expression of a first parameter $a1'$ associated with the pixel that is in the restored target image and that is at the corresponding position of the first pixel may be obtained by combining the expression (2) with the expression (3):

$$ar=1-[(Cr2-Cr1)/255] \qquad (4)$$

In step 220, then it is determined, according to the first parameter and the preset color depth, a transparency of the pixel that is in the target image and that is at the corresponding position of the first pixel, and it is determined, according to the RGB value of the first pixel and the first parameter, an RGB value of the pixel that is in the target image and that is at the corresponding position of the first pixel.

For example, in the foregoing example, in a case that the first preset value is 0 and the second preset value is 255, an expression of a color value $Cf1'$ of a target color of the pixel that is in the restored target image and that is at the corresponding position of the first pixel may be obtained based on the expression (2):

$$Cf1'=Cr1/a1'=(Cr1\times255)/(255-Cr2+Cr1) \qquad (5)$$

Because the first parameter is the restored first ratio, an expression of a transparency $Af1'$ of the pixel that is in the restored target image and that is at the corresponding position of the first pixel may be obtained based on the definition of the first ratio:

$$Af1'=a1'\times255=255-Cr2+Cr1 \qquad (6)$$

An AGRB value of each pixel in the target image may be restored by using the expression (4), the expression (5), and the expression (6).

In this embodiment of this disclosure, an ARGB value of each pixel in the target image can be quickly restored by using a restoration algorithm corresponding to a simple and general image blending algorithm, which is highly applicable and can save calculation resources.

Still referring to FIG. 5, the data receive terminal receives the RGB data of each first pixel in the first hybrid image and the RGB data of each second pixel in the second hybrid image through the display receive interface. The data receive terminal may restore the first image data in an RGB format to obtain the ARGB data of the target image. Then, the data receive terminal may blend the restored target image in an ARGB format with an image at another layer (for example, a video layer image).

In some other embodiments of this disclosure, the preset background image includes a third preset image, a third pixel and a fourth pixel in the third preset image are disposed at intervals, an RGB value of the third pixel is a third preset value, and an RGB value of the fourth pixel is a fourth preset value, where the fourth preset value is determined based on the number of bits of a preset color depth.

The first image data includes an RGB value of each fifth pixel in a third hybrid image, where the third hybrid image is an image obtained after image blending is performed on the target image and the third preset image.

In this embodiment of this disclosure, the preset background image is an image whose third pixel and fourth pixel are disposed at intervals. In this case, there is only one preset background image, and therefore the number of background images on which image blending is performed can be reduced, thereby accelerating image blending efficiency.

In an example, the third preset value is 0, and the fourth preset value is $2n-1$, where n is the number of bits of the preset color depth. For example, if the number of bits of the preset color depth is 8, the fourth preset value is 255. That is, the third preset image may be a black and white image.

In this embodiment of this disclosure, the RGB value of the fifth pixel is obtained after weighted summation is performed, based on a second ratio, on an RGB value of a fourth target pixel in the target image and an RGB value of a pixel that is in the third preset image and that is at a corresponding position of the fifth pixel, where the fourth target pixel is a pixel that is in the target image and that is at a corresponding position of the fifth pixel, and the second ratio is a ratio of a transparency of the second target pixel to the preset color depth.

In some embodiments, the data transmit terminal uses the target image in an ARGB format as a foreground image, uses the third preset image as a background image, and performs image blending on the target image and the third preset image by using the expression (1) to obtain the third hybrid image.

For example, when the third preset value is 0, that is, the third pixel in the third preset image is a black pixel, that is, an RGB value of each third pixel is 0. When the third pixel in the third preset image is blended with a pixel at a corresponding position in the target image, that is, in a case that the pixel that is in the third preset image and that is at the corresponding position of the fifth pixel is the third pixel, an expression of a color value $Cr3$ of a target color of the fifth pixel in the third hybrid image may be obtained:

$$Cr3=a2\times Cf2 \qquad (7)$$

$Cf2$ is a color value of a target color of the fourth target pixel that is in the target image and that is at the corresponding position of the fifth pixel, and $a2$ is a ratio of a transparency $Af2$ of the fourth target pixel to the preset color depth. The target color may be red (R), green (G), or blue (B). An RGB value of each fifth pixel at a corresponding position of the third pixel in the third hybrid image may be obtained by using the expression (7).

For example, the fourth preset value is 255, that is, the fourth pixel in the third preset image is a white pixel, and an RGB of each fourth pixel is 255. When the fourth pixel in the third preset image is blended with a pixel at a corresponding position in the target image, that is, in a case that the pixel that is in the third preset image and that is at the corresponding position of the fifth pixel is the fourth pixel, an expression of a color value $Cr4$ of a target color of the fifth pixel in the third hybrid image may be obtained:

$$Cr4=a2 \times Cf2+(1-a2) \times 255 \qquad (8)$$

$Cf2$ is a color value of a target color of the fourth target pixel that is in the target image and that is at the corresponding position of the fifth pixel, and a2 is a ratio of a transparency $Af2$ of the fourth target pixel to the preset color depth. The target color may be red (R), green (G), or blue (B). An RGB value of each fifth pixel at a corresponding position of the fourth pixel in the third hybrid image may be obtained by using the expression (8).

In this embodiment of this disclosure, weighted summation is performed the RGB value of the fourth target pixel in the target image and the RGB value of the pixel that is in the third preset image and that is at the corresponding position of the fifth pixel by using the second ratio, so as to blend the third preset image and the target image. This blending manner has high versatility, which can save calculation resources and interfaces resources, and simplify transmission of ARGB data.

Figure 6:
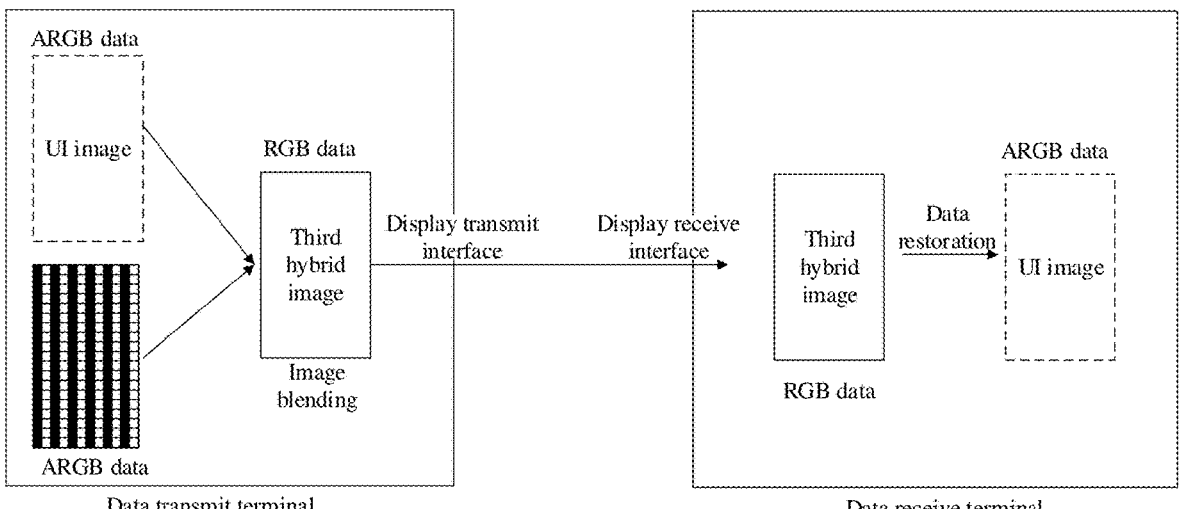
FIG. 6 is a schematic flowchart of a fourth embodiment of a data processing method according to this disclosure.

FIG. 6 is a schematic diagram of a fourth embodiment of a data processing method according to this disclosure. As shown in FIG. 6, the data transmit terminal performs image blending on the target image in an ARGB format and the third preset image in black and white to obtain the third hybrid image in an RGB format. The data transmit terminal transmits the RGB value of each fifth pixel in the third hybrid image to the data receive terminal through a display transmit interface. The data receive terminal receives the RGB value of each fifth pixel in the third hybrid image through a display receive interface. The data receive terminal performs data restoration processing on the RGB value of each fifth pixel in the third hybrid image, to obtain the ARGB value of each pixel in the target image.

In this embodiment of this disclosure, in a case that the first image data includes the RGB value of each fifth pixel in the third hybrid image, step 220 includes: determining, for each fifth pixel based on the RGB value of the fifth pixel and an RGB value of at least one fifth target pixel in the third hybrid image, an ARGB value of a sixth target pixel that is in the target image and that is at a corresponding position of the fifth pixel.

The fifth target pixel is adjacent to the fifth pixel, and an RGB value of a pixel that is in the third preset image and that is at a corresponding position of the fifth target pixel is different from an RGB value of a pixel that is in the third preset image and that is at a corresponding position of the fifth pixel.

In an example, if the pixel that is in the third preset image and that is at the corresponding position of the fifth target pixel is the third pixel, the pixel that is in the third preset image and that is at the corresponding position of the fifth pixel is the fourth pixel.

FIG. 7 is a schematic diagram of the third hybrid image according to this disclosure. As shown in FIG. 7, a pixel that is in the third preset image and that is at a corresponding position of the fifth pixel whose color value of a target color is $Cr3$ is the third pixel, and a pixel that is in the third preset image and that is at a corresponding position of the fifth pixel whose color value of a target color is $Cr4$ is the fourth pixel.

In an example, for a fifth pixel in a third row and a third column (a pixel represented by left slashes in FIG. 7), eight pixels are adjacent to the fifth pixel, that is, a fifth pixel in a second row and a second column, a fifth pixel in a second row and a third column, a fifth pixel in a second row and a fourth column, a fifth pixel in a third row and a second column, a fifth pixel in a third row and a fourth column, a fifth pixel in a fourth row and a second column, a fifth pixel in a fourth row and a third column, and a fifth pixel in a fourth row and a fourth column. Because the RGB value of the pixel that is in the third preset image and that is at the corresponding position of the fifth target pixel is different from the RGB value of the pixel that is in the third preset image and that is at the corresponding position of the fifth pixel, the fifth target pixel may be the fifth pixel in the second row and the third column, the fifth pixel in the third row and the second column, the fifth pixel in the third row and the fourth column, or the fifth pixel in the fourth row and the third column. The fifth target pixel is a fifth pixel filled with grid lines in FIG. 7.

In this embodiment of this disclosure, based on a case that RGB values of adjacent pixels in the target image may be equal, the ARGB data of the sixth target pixel that is in the target image and that is at the corresponding position of the fifth pixel may be restored by using RGB data of the fifth pixel and RGB data of at least one fifth target pixel.

In this embodiment of this disclosure, the preset background image is an image whose third pixel and fourth pixel are disposed at intervals. Because there is only one preset background image, the number of background images on which image blending is performed can be reduced. ARGB data of a pixel that is in the target image and that is at a corresponding position of the fifth pixel may be restored by using the RGB data of the fifth pixel and the RGB data of the fifth target pixel, to restore data of the target image, thereby increasing transmission efficiency of the target image.

In some embodiments, step 220 includes: calculating an average value of color values of target colors of all fifth target pixels, where the target color is any one of the following colors: red, green, and blue; obtaining a second parameter based on each average value, the RGB value of the fifth pixel, and the fourth preset value; determining, according to the second parameter and the preset color depth, a transparency of the sixth target pixel that is in the target image and that is at the corresponding position of the fifth pixel; and determining, according to the RGB value of the fifth pixel and the second parameter, an RGB value of the sixth target pixel that is in the target image and that is at the corresponding position of the fifth pixel.

In this embodiment of this disclosure, the second parameter is the restored second ratio.

If the pixel that is in the third preset image and that is at the corresponding position of the fifth pixel is the third pixel, and the pixel at the corresponding position of the fifth target pixel is the fourth pixel, an expression of a second parameter $a2'$ associated with the sixth target pixel that is in the restored target image and that is at the corresponding position of the fifth pixel may be obtained based on the expression (7) and the expression (8):

$$a2'=1-[(Cr4'-Cr3)/255] \qquad (9)$$

Cr3 is a color value of a target color of the fifth pixel at the corresponding position of the third pixel, and Cr4 is an average value of color values of target colors of all fifth target pixels in at least one fifth target pixel corresponding to the fifth pixel.

In a case that the third preset value is 0, the fourth preset value is 255, and the pixel that is in the third preset image and that is at the corresponding position of the fifth pixel is the third pixel, an expression of a color value Cf2' of a target color of the sixth target pixel that is in the restored target image and that is at the corresponding position of the fifth pixel may be obtained based on the expression (7):

$$Cf2'=Cr3/a2'=(Cr3\times255)/(255-Cr4'+Cr3) \tag{10}$$

In a case that the pixel that is in the third preset image and that is at the corresponding position of the fifth pixel is the third pixel, because the second parameter is the restored second ratio, an expression of a transparency Af2' of the sixth target pixel that is in the restored target image and that is at the corresponding position of the fifth pixel may be obtained based on the definition of the second ratio:

$$Af2'=a2'\times255=255\times Cr4'+Cr3 \tag{11}$$

Correspondingly, if the pixel that is in the third preset image and that is at the corresponding position of the fifth pixel is the fourth pixel, and the pixel that is in the third preset image and that is at the corresponding position of the fifth target pixel is the third pixel, an expression of a second parameter a2' associated with the sixth target pixel that is in the restored target image and that is at the corresponding position of the fifth pixel may be obtained based on the expression (7) and the expression (8):

$$a2'=1-[(Cr4-Cr3')/255] \tag{12}$$

Cr4 is a color value of a target color of the fifth pixel at the corresponding position of the fourth pixel, and Cr3' is an average value of color values of target colors of all fifth target pixels in at least one fifth target pixel corresponding to the fifth pixel.

If the pixel that is in the third preset image and that is at the corresponding position of the fifth pixel is the fourth pixel, and the pixel at the corresponding position of the fifth target pixel is the third pixel, an expression of a color value Cf2' of a target color of the sixth target pixel that is in the restored target image and that is at the corresponding position of the fifth pixel may be obtained based on the expression (7):

$$Cf2'=Cr37a2'=(Cr3'\times255)/(255-Cr4+Cr3') \tag{13}$$

Cr4 is a color value of a target color of the fifth pixel at the corresponding position of the fourth pixel, and Cr3 is an average value of color values of target colors of all fifth target pixels in at least one fifth target pixel corresponding to the fifth pixel.

In a case that the pixel that is in the third preset image and that is at the corresponding position of the fifth pixel is the fourth pixel, because the second parameter is the restored second ratio, an expression of a transparency Af2' of the sixth target pixel that is in the restored target image and that is at the corresponding position of the fifth pixel may be obtained based on the definition of the second ratio:

$$Af2'=a2'\times255=255-Cr4+Cr3' \tag{14}$$

The AGRB value of each pixel in the target image may be restored by using the expression (9) to the expression (14).

In this embodiment of this disclosure, an ARGB value of each pixel in the target image may be quickly restored based on a case that RGB values of adjacent pixels in the target image are the case and by using a restoration algorithm corresponding to a simple and general image blending algorithm, which is highly applicable and can save calculation resources.

In some embodiments of this disclosure, to improve accuracy of restoring the ARGB data of the target image, the restored ARGB data of the sixth target pixel may be checked. After step 220, the data processing method 200 provided in this disclosure further includes:

Step 230: in a case of determining that the sixth target pixel is an opaque pixel, determine a transparency of the sixth target pixel as the fourth preset value, and determine an RGB value of the sixth target pixel as an RGB value of the fifth pixel at the corresponding position of the sixth target pixel.

Step 240: in a case of determining that the sixth target pixel is a black translucent pixel, determine the RGB value of the sixth target pixel as the third preset value.

Step 250: in a case that a pixel position of the sixth target pixel corresponds to a pixel position of the third pixel, determine the transparency of the sixth target pixel based on the RGB value of the at least one fifth target pixel.

Step 260: in a case that the pixel position of the sixth target pixel corresponds to a pixel position of the fourth pixel, determine the transparency of the sixth target pixel based on the RGB value of the fifth pixel at the corresponding position of the sixth target pixel.

In this embodiment of this disclosure, there may be a black translucent pixel and an opaque pixel in the target image. The opaque pixel is a pixel of the second ratio a2=1. It should be noted that, if a pixel corresponds to a2=1, the pixel is a completely opaque pixel, and if a pixel corresponds to a2=0, the pixel is a completely transparent pixel. If a2 corresponding to a pixel is between 0 and 1, the pixel is a translucent pixel. A black translucent pixel is a pixel whose RGB value is 0 and a2 is between 0 and 1.

In this embodiment of this disclosure, for the fifth pixel in the target image, if the fifth pixel is an opaque pixel, and the pixel that is in the third preset image and that is at the corresponding position of the fifth pixel is the third pixel, because a2=1, an expression of a color value Cr3 of a target color of the fifth pixel may be obtained based on the expression (7):

$$Cr3=Cf2 \tag{15}$$

For the fifth pixel in the target image, if the fifth pixel is an opaque pixel, and the pixel that is in the third preset image and that is at the corresponding position of the fifth pixel is the fourth pixel, because a2=1, an expression of a color value Cr4 of a target color of the fifth pixel may be obtained based on the expression (8):

$$Cr4=Cf2 \tag{16}$$

In this embodiment of this disclosure, for the fifth pixel in the target image, if the fifth pixel is a black translucent pixel, and the pixel that is in the third preset image and that is at the corresponding position of the fifth pixel is the third pixel, because Cf2=0, an expression of a color value Cr3 of a target color of the fifth pixel may be obtained based on the expression (7):

$$Cr3=0 \tag{17}$$

For the fifth pixel in the target image, if the fifth pixel is a black translucent pixel, and the pixel that is in the third preset image and that is at the corresponding position of the fifth pixel is the fourth pixel, an expression of a color value Cr4 of a target color of the fifth pixel may be obtained based on the expression (8):

$$Cr4=(1-a2)\times255 \tag{18}$$

In this embodiment of this disclosure, for the sixth target pixel in the target image, if there are eight adjacent pixels of the sixth target pixel, AGRB values of the adjacent pixels of the sixth target pixel may be used to determine whether the sixth target pixel is an opaque pixel or a black translucent pixel.

In this embodiment of this disclosure, if there are eight adjacent pixels of the sixth target pixel, it may be determined whether transparencies of the eight adjacent pixels are all the fourth preset value. If the transparencies of the eight adjacent pixels of the sixth target pixel are all the fourth preset value (for example, 255), it is determined that the sixth target pixel is an opaque pixel.

In another embodiment of this disclosure, if there are eight adjacent pixels of the sixth target pixel, it may be determined whether an RGB value of each of the eight adjacent pixel is the third preset value (for example, 0). If the RGB value of each of the eight adjacent pixels of the sixth target pixel is 0, it is determined that the sixth target pixel is a black translucent pixel.

In this embodiment of this disclosure, a category of the sixth target pixel is determined based on the RGB values of the eight adjacent pixels of the sixth target pixel, so that the restored RGB value of the sixth target pixel can be verified, thereby improving accuracy of restoring ARGB data of the target image.

In step 230, in a case that the sixth target pixel is an opaque pixel, and the pixel position of the sixth target pixel corresponds to the position of the third pixel, if the second parameter a2' that is associated with the sixth target pixel and that is restored based on the expression (9) is not 1, the corrected transparency Af2" of the sixth target pixel is corrected to the fourth preset value, and the corrected color value Cf2" of the target color of the sixth target pixel is determined as the color value Cr3 of the target color of the fifth pixel at the corresponding position of the sixth target pixel based on the expression (15), that is, Cf2"=Cr3.

In step 230, in a case that the sixth target pixel is an opaque pixel, and the pixel position of the sixth target pixel corresponds to the position of the fourth pixel, if the second parameter a2' that is associated with the sixth target pixel and that is restored based on the expression (9) is not 1, the corrected transparency Af2" of the sixth target pixel is corrected to the fourth preset value, and the corrected color value Cf2" of the target color of the sixth target pixel is determined as the color value Cr4 of the target color of the fifth pixel at the corresponding position of the sixth target pixel based on the expression (16), that is, Cf2"=Cr4.

In step 240, in this embodiment of this disclosure, in a case that the sixth target pixel is a black translucent pixel, if Cf2' that is of the sixth target pixel and that is restored based on the expression (10) or the expression (13) is not 0, the corrected color value Cf2" of the target color of the sixth target pixel is determined as 0 based on the expression (17).

In step 250, in a case that the sixth target pixel is a black translucent pixel, and the pixel position of the sixth target pixel corresponds to the position of the third pixel, if Cf2' that is of the sixth target pixel and that is restored based on the expression (9) and the expression (10) is not 0, the corrected second parameter a2" associated with the sixth target pixel is determined based on the expression (18):

$$a2''=1-(Cr4'/255) \tag{19}$$

Cr4' is an average value of color values Cr4 of target colors of all of at least one fifth target pixel corresponding to the fifth pixel at the corresponding position of the sixth target pixel. The fifth target pixel is adjacent to the fifth pixel at the corresponding position of the sixth target pixel, and an RGB value of a pixel that is in the preset image and that is at a corresponding position of the fifth target pixel is different from an RGB value of a pixel that is in the third preset image and that is at a corresponding position of the fifth pixel.

Therefore, in a case that the sixth target pixel is a black translucent pixel, and the pixel position of the sixth target pixel corresponds to the position of the third pixel, an expression of a corrected transparency Af' of the sixth target pixel may be obtained based on the expression (19):

$$Af'[1-(Cr4'/255)]/255 \tag{20}$$

In step 260, in a case that it is determined that the sixth target pixel is a black translucent pixel, and the pixel position of the sixth target pixel corresponds to the position of the fourth pixel, if Cf2' that is of the sixth target pixel and that is restored based on the expression (12) and the expression (13) is not 0, the corrected second parameter a2" associated with the sixth target pixel is determined based on the expression (18):

$$a2''=1-(Cr4/255) \tag{21}$$

Cr4 is a color value of a target color of the fifth pixel at the corresponding position of the sixth target pixel. Therefore, in a case that the sixth target pixel is a black translucent pixel, and the pixel position of the sixth target pixel corresponds to the position of the fourth pixel, an expression of a corrected transparency Af' of the sixth target pixel may be obtained based on the expression (21):

$$Af'[1-(Cr4/255)]/255 \tag{22}$$

It should be noted that an execution sequence of step 230, step 240, step 250, and step 260 is not limited.

It should be noted that if an ARGB value of an adjacent pixel of the sixth target pixel is corrected, the corrected ARGB value of the adjacent pixel of the sixth target pixel is used to determine whether the sixth target pixel is an opaque pixel or a black translucent pixel.

In this embodiment of this disclosure, based on a category of the sixth pixel, the restored ARGB value of the sixth target pixel in the target image may be corrected, so that accuracy of an obtained ARGB value of a pixel in the target image is improved.

In some embodiments of this disclosure, many adjacent pixels of a normal UI image are generally the same. Therefore, it may be determined, according to the RGB value of the fifth pixel in the third hybrid image in advance, whether the sixth target pixel that is in the target image and that is at the corresponding position of the fifth pixel is a black translucent pixel or an opaque pixel. That is, data block classification may be performed in advance on the sixth target pixel corresponding to the fifth pixel in the third hybrid image.

In this embodiment of this disclosure, it may be determined whether the RGB values of the eight adjacent pixels of the fifth pixel are equal, so as to determine whether the sixth target pixel at the corresponding position of the fifth pixel is an opaque pixel. If it is determined that the RGB values of the eight adjacent pixels of the fifth pixel are equal, it is determined that the sixth target pixel at the corresponding position of the fifth pixel is an opaque pixel. Otherwise, it is determined that the sixth target pixel at the corresponding position of the fifth pixel is not an opaque pixel.

In this embodiment of this disclosure, if it is determined that an RGB value of each seventh target pixel in the third hybrid image is the third preset value and that RGB values of all fifth target pixels are equal, it is determined that the sixth target pixel that is in the target image and that corresponds to the fifth pixel is a black translucent pixel. Otherwise, it is determined that the sixth target pixel at the corresponding position of the fifth pixel is not a black translucent pixel.

The seventh target pixel is adjacent to the fifth pixel, and an RGB value of a pixel that is in the third preset image and that corresponds to the seventh target pixel is the same as an RGB value of a pixel that is in the third preset image and that corresponds to the fifth pixel.

Referring to FIG. 7, for a fifth pixel in a third row and a third column, because the RGB value of the pixel that is in the third preset image and that is at the corresponding position of the seventh target pixel is the same as the RGB value of the pixel that is in the third preset image and that is at the corresponding position of the fifth pixel, the seventh target pixel may be a fifth pixel in a second row and a second column, a fifth pixel in a second row and a fourth column, a fifth pixel in a fourth row and a second column, or a fifth pixel in a fourth row and a fourth column. The seventh target pixel is a pixel filled with vertical lines in FIG. 7.

In this embodiment of this disclosure, data block classification is performed on the sixth target pixel at the corresponding position of the fifth pixel in the third hybrid image based on the RGB value of each fifth pixel in the third hybrid image, and a data block category to which the sixth target pixel belongs (for example, a black translucent pixel or an opaque pixel) is used, thereby improving accuracy of restoring the ARGB data of the sixth target pixel.

In this embodiment of this disclosure, if a data type of the sixth target pixel corresponding to the fifth pixel is determined based on the RGB value of the fifth pixel in the third hybrid image, step 220 includes:

Step 2201: for the fifth pixel, in a case of determining that a sixth target pixel that is in the target image and that corresponds to the fifth pixel is an opaque pixel, determine an RGB value of the sixth target pixel as an RGB value of the fifth pixel, and determining a transparency of the sixth target pixel as the fourth preset value.

Step 2202: for the fifth pixel, in a case of determining that the sixth target pixel that is in the target image and that corresponds to the fifth pixel is a black translucent pixel, determine the RGB value of the sixth target pixel as the third preset value.

Step 2203: in a case that a pixel position of the fifth pixel corresponds to a pixel position of the third pixel, determine the transparency of the sixth target pixel based on an RGB value of at least one fifth target pixel.

Step 2204: in a case that the pixel position of the fifth pixel corresponds to a pixel position of the fourth pixel, determine the transparency of the sixth target pixel based on the RGB value of the fifth pixel corresponding to the sixth target pixel.

The fifth target pixel is adjacent to the fifth pixel, and an RGB value of a pixel that is in the third preset image and that is at a corresponding position of the fifth target pixel is different from an RGB value of a pixel that is in the third preset image and that is at a corresponding position of the fifth pixel.

In this embodiment of this disclosure, an implementation of step 2201 is similar to the implementation of step 230, an implementation of step 2202 is similar to the implementation of step 240, an implementation of step 2203 is similar to the implementation of step 250, and an implementation of step 2204 is similar to the implementation of step 260. Details are not described herein again.

In this embodiment of this disclosure, implementations of step 2201, step 2202, step 2203, and step 2204 are not specifically limited.

In this embodiment of this disclosure, the ARGB data of the sixth target pixel may be restored by using a data block category to which the sixth target pixel belongs (for example, a black translucent pixel or an opaque pixel), thereby improving accuracy of restoring the ARGB data of the sixth target pixel.

In this embodiment of this disclosure, if there are less than eight adjacent pixels of the fifth pixel, for example, a fifth pixel at an edge in the third hybrid image, it is not easy to determine a data block category of this fifth pixel, and the ARGB value of the sixth target pixel that is in the target image and that is at the corresponding position of the fifth pixel may be determined based on the RGB value of the fifth pixel and the RGB value of the at least one fifth target pixel in the third hybrid image.

If the sixth target pixel corresponding to the fifth pixel is neither an opaque pixel nor a black translucent pixel, the ARGB value of the sixth target pixel that is in the target image and that is at the corresponding position of the fifth pixel may be determined based on the RGB value of the fifth pixel and the RGB value of the at least one fifth target pixel in the third hybrid image.

In this embodiment of this disclosure, in a case that a data block category to which the sixth target pixel corresponding to the fifth pixel cannot be accurately determined, based on a case that RGB values of adjacent pixels in the target image may be equal, the ARGB data of the sixth target pixel that is in the target image and that is at the corresponding position of the fifth pixel may be restored by using RGB data of the fifth pixel and RGB data of at least one fifth target pixel.

In this embodiment of the present disclosure, ARGB data is converted into RGB data by using the common image blending algorithm. This method has high versatility, which can save calculation resources and interfaces resources, and simplify transmission of ARGB data.

The data processing method provided in the embodiments of this disclosure may be performed by a data processing apparatus, or a control module that is in the data processing apparatus and that is configured to perform the data processing method. It should be noted that in the embodiments of this disclosure, that the data processing apparatus performs the data processing method is used as an example to describe the data processing apparatus provided in the embodiments of this disclosure.

Figure 8:
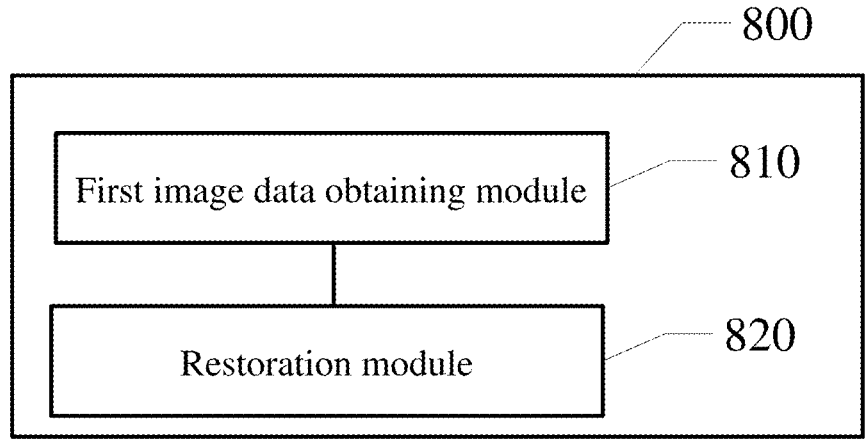
FIG. 8 is a schematic structural diagram of a data processing apparatus according to an embodiment of the present disclosure.

FIG. 8 is a schematic structural diagram of an embodiment of a data processing apparatus according to this disclosure. As shown in FIG. 8, a data processing apparatus 800 includes:

a first image data obtaining module 810, configured to receive, through a display interface, first image data in an RGB format sent by a data transmit terminal, where the first image data is image data obtained after image blending is performed on ARGB data of a target image and image data of a preset background image, and the display interface is used to receive data in an RGB format; and a restoration module 820, configured to perform data restoration processing on the first image data to obtain the ARGB data of the target image.

In this embodiment of this disclosure, a display interface of a data receive terminal can only transmit data in an RGB format. To transmit ARGB data of a target image, a data transmit end needs to blend the ARGB data that is of the target image and that needs to be transmitted with image data of a preset background image in advance to obtain first image data in an RGB format. The display interface of the data receive terminal may receive the first image data in an RGB format sent by the data transmit terminal. Because the first image data includes image data information of the target image, the data receive terminal obtains the ARGB data of the target image by performing data restoration processing on the first image data, so that the data receive terminal can obtain data in an ARGB format.

In this embodiment of this disclosure, the preset background image includes a first preset image and a second preset image, an RGB value of each pixel in the first preset image is a first preset value, an RGB value of each pixel in the second preset image is a second preset value, and the second preset value is determined based on the number of bits of a preset color depth;

the first image data includes an RGB value of each first pixel in a first hybrid image and an RGB value of each second pixel in a second hybrid image; and the first hybrid image is an image obtained after image blending is performed on the target image and the first preset image, and the second hybrid image is an image obtained after image blending is performed on the target image and the second preset image.

In this embodiment of this disclosure, the RGB value of the first pixel is data obtained after weighted summation is performed on an RGB value of a first target pixel in the target image and an RGB value of a second target pixel in the first preset image based on a first ratio; and the RGB value of the second pixel that is in the second hybrid image and that corresponds to the first pixel is data obtained after weighted summation is performed on the RGB value of the first target pixel and an RGB value of a third target pixel in the second preset image based on the first ratio, where the first target pixel is a pixel that is in the target image and that is at a corresponding position of the first pixel, the second target pixel is a pixel that is in the first preset image and that is at a corresponding position of the first target pixel, and the third target pixel is a pixel that is in the second preset image and that is at a corresponding position of the first target pixel; and the first ratio is a ratio of a transparency of the first target pixel to the preset color depth.

In this embodiment of this disclosure, the restoration module 820 includes a first restoration unit, and the first restoration unit is configured to:

calculate, for each first pixel based on the RGB value of the first pixel and the RGB value of the second pixel at the corresponding position of the first pixel, an ARGB value of a pixel that is in the target image and that is at a corresponding position of the first pixel.

In this embodiment of this disclosure, the first restoration unit is configured to:

obtain a first parameter based on the RGB value of the first pixel, the RGB value of the second pixel at the corresponding position of the first pixel, and the second preset value; and determine, according to the first parameter and the preset color depth, a transparency of the pixel that is in the target image and that is at the corresponding position of the first pixel, and determine, according to the RGB value of the first pixel and the first parameter, an RGB value of the pixel that is in the target image and that is at the corresponding position of the first pixel.

In this embodiment of this disclosure, the preset background image includes a third preset image, a third pixel and a fourth pixel in the third preset image are disposed at intervals, an RGB value of the third pixel is a third preset value, and an RGB value of the fourth pixel is a fourth preset value, where the fourth preset value is determined based on the number of bits of a preset color depth; and the first image data includes an RGB value of each fifth pixel in a third hybrid image, where the third hybrid image is an image obtained after image blending is performed on the target image and the third preset image.

In this embodiment of this disclosure, the RGB value of the fifth pixel is obtained after weighted summation is performed, based on a second ratio, on an RGB value of a fourth target pixel in the target image and an RGB value of a pixel that is in the third preset image and that is at a corresponding position of the fifth pixel, where the fourth target pixel is a pixel that is in the target image and that is at a corresponding position of the fifth pixel, and the second ratio is a ratio of a transparency of the second target pixel to the preset color depth.

In this embodiment of this disclosure, the restoration module 820 includes a second restoration unit, and the second restoration unit is configured to:

determine, for each fifth pixel based on the RGB value of the fifth pixel and an RGB value of at least one fifth target pixel in the third hybrid image, an ARGB value of a sixth target pixel that is in the target image and that is at a corresponding position of the fifth pixel, where the fifth target pixel is adjacent to the fifth pixel, and an RGB value of a pixel that is in the third preset image and that is at a corresponding position of the fifth target pixel is different from an RGB value of a pixel that is in the third preset image and that is at a corresponding position of the fifth pixel.

In this embodiment of this disclosure, the second restoration unit is configured to:

calculate an average value of color values of target colors of all fifth target pixels, where the target color is any one of the following colors: red, green, and blue;

obtain a second parameter based on each average value, the RGB value of the fifth pixel, and the fourth preset value;

determine, according to the second parameter and the preset color depth, a transparency of the sixth target pixel that is in the target image and that is at the corresponding position of the fifth pixel; and determine, according to the RGB value of the fifth pixel and the second parameter, an RGB value of the sixth target pixel that is in the target image and that is at the corresponding position of the fifth pixel.

In this embodiment of this disclosure, the data processing apparatus 800 further includes:

a first determining module, configured to: in a case of determining that the sixth target pixel is an opaque pixel, determine a transparency of the sixth target pixel as the fourth preset value, and determine an RGB value of the sixth target pixel as an RGB value of the fifth pixel at the corresponding position of the sixth target pixel;

a second determining module, configured to: in a case of determining that the sixth target pixel is a black translucent pixel, determine the RGB value of the sixth target pixel as the third preset value;

a third determining module, configured to: in a case that a pixel position of the sixth target pixel corresponds to a pixel position of the third pixel, determine the transparency of the sixth target pixel based on the RGB value of the at least one fifth target pixel; and a fourth determining module, configured to: in a case that the pixel position of the sixth target pixel corresponds to a pixel position of the fourth pixel, determine the transparency of the sixth target pixel based on the RGB value of the fifth pixel at the corresponding position of the sixth target pixel.

In this embodiment of this disclosure, the first determining module is configured to:

if it is determined that transparencies of eight adjacent pixels of the sixth target pixel in the target image are all the fourth preset value, determine that the sixth target pixel is an opaque pixel; and the second determining module is configured to:

if it is determined that RGB values of the eight adjacent pixels of the sixth target pixel in the target image are all the third preset value, determine that the sixth target pixel is a black translucent pixel.

In this embodiment of this disclosure, the restoration module 820 includes:

a first determining unit, configured to: for the fifth pixel, in a case of determining that a sixth target pixel that is in the target image and that is at a corresponding position of the fifth pixel is an opaque pixel, determine an RGB value of the sixth target pixel as an RGB value of the fifth pixel, and determining a transparency of the sixth target pixel as the fourth preset value;

a second determining unit, configured to: for the fifth pixel, in a case of determining that the sixth target pixel that is in the target image and that is at the corresponding position of the fifth pixel is a black translucent pixel, determine the RGB value of the sixth target pixel as the third preset value;

a third determining unit, configured to: in a case that a pixel position of the fifth pixel corresponds to a pixel position of the third pixel, determine the transparency of the sixth target pixel based on an RGB value of at least one fifth target pixel; and a fourth determining unit, configured to: in a case that the pixel position of the fifth pixel corresponds to a pixel position of the fourth pixel, determine the transparency of the sixth target pixel based on the RGB value of the fifth pixel at the corresponding position of the sixth target pixel, where the fifth target pixel is adjacent to the fifth pixel, and an RGB value of a pixel that is in the third preset image and that is at a corresponding position of the fifth target pixel is different from an RGB value of a pixel that is in the third preset image and that is at a corresponding position of the fifth pixel.

In some embodiments of this disclosure, the first determining unit is configured to:

if it is determined that RGB values of eight adjacent pixels of the fifth pixel are equal, determine that the sixth target pixel that corresponds to the fifth pixel is an opaque pixel; and the second determining unit is configured to:

if it is determined that an RGB value of each seventh target pixel in the third hybrid image is the third preset value and that RGB values of all fifth target pixels are equal, determine that the sixth target pixel that is in the target image and that is at the corresponding position of the fifth pixel is a black translucent pixel, where the seventh target pixel is adjacent to the fifth pixel, and an RGB value of a pixel that is in the third preset image and that is at a corresponding position of the seventh target pixel is the same as an RGB value of a pixel that is in the third preset image and that is at a corresponding position of the fifth pixel.

The data processing apparatus in this embodiment of this disclosure may be an apparatus, or may be a component, an integrated circuit, or a chip in the apparatus. The apparatus may be a mobile electronic device, or may be a non-mobile electronic device. For example, the mobile electronic device may be a mobile phone, a tablet computer, a laptop computer, a palmtop computer, an in-vehicle electronic terminal, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in the embodiments of this disclosure.

The data processing apparatus in this embodiment of this disclosure may be an apparatus with an operating system. The operating system may be an Android operating system, an iOS operating system, or another possible operating system. This is not specifically limited in the embodiments of this disclosure.

The data processing apparatus provided in this embodiment of this disclosure can implement the processes implemented by the data processing apparatus in the method embodiments in FIG. 2 to FIG. 7. To avoid repetition, details are not described herein again.

Figure 9:
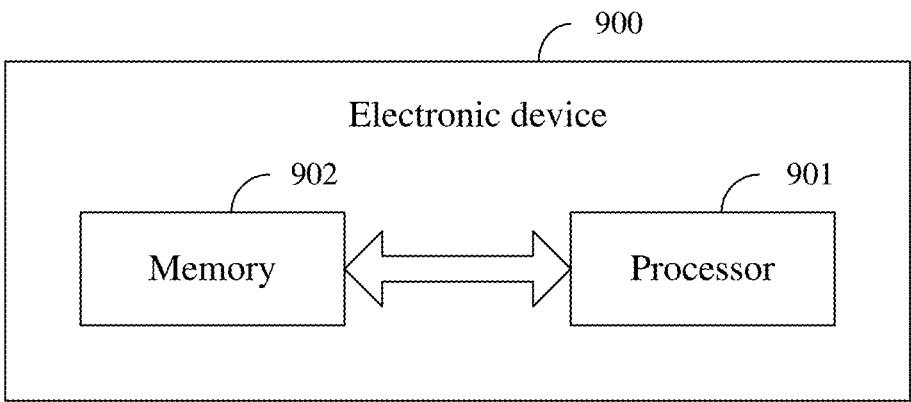
FIG. 9 is a first schematic structural diagram of an electronic device according to an embodiment of the present disclosure.

Optionally, as shown in FIG. 9, an embodiment of this disclosure further provides an electronic device 900, including a processor 901, a memory 902, and a program or an instruction that is stored in the memory 902 and executable on the processor 901. When the program or the instruction is executed by the processor 901, the processes of the foregoing data processing method embodiment are implemented and a same technical effect can be achieved. To avoid repetition, details are not described herein again.

It should be noted that the electronic device in this embodiment of this disclosure includes the foregoing mobile electronic device and the foregoing non-mobile electronic device.

Figure 10:
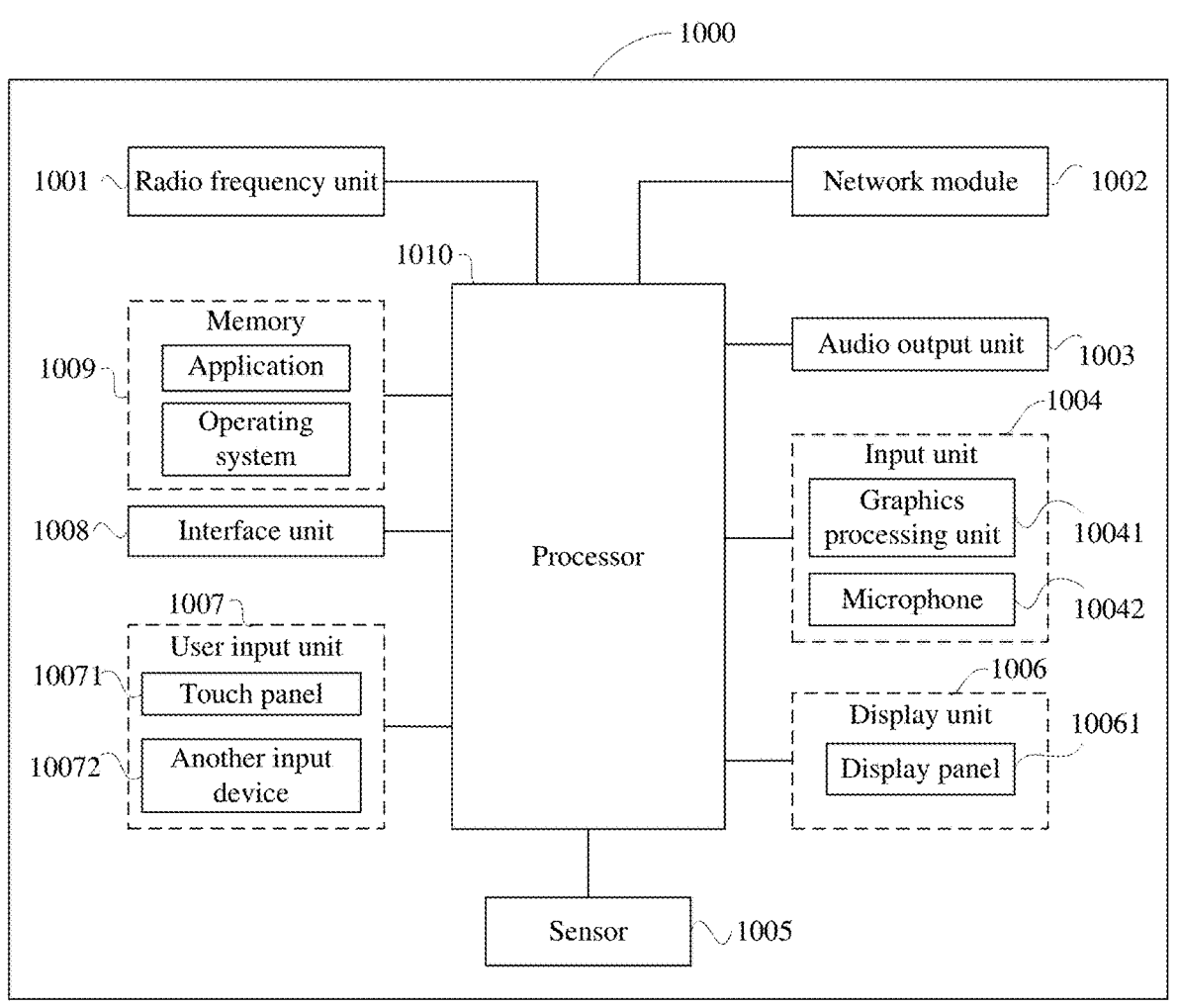
FIG. 10 is a second schematic structural diagram of an electronic device according to an embodiment of the present disclosure.

FIG. 10 is a schematic structural diagram of hardware of an electronic device according to an embodiment of this disclosure.

An electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (such as a battery) that supplies power to each component. The power supply may be logically connected to the processor 1010 by using a power supply management system, to implement functions such as charging and discharging management, and power consumption management by using the power supply management system. The structure of the electronic device shown in FIG. 10 does not constitute a limitation on the electronic device. The electronic device may include components more or fewer than those shown in the diagram, a combination of some components, or different component arrangements. Details are not described herein.

The processor 1010 is configured to: receive, through a display interface, first image data in an RGB format sent by a data transmit terminal, where the first image data is image data obtained after image blending is performed on ARGB data of a target image and image data of a preset background image, and the display interface is used to receive data in an RGB format; and perform data restoration processing on the first image data to obtain the ARGB data of the target image.

In this embodiment of this disclosure, a display interface of a data receive terminal can only transmit data in an RGB format. To transmit ARGB data of a target image, a data transmit end needs to blend the ARGB data that is of the target image and that needs to be transmitted with image data of a preset background image in advance to obtain first image data in an RGB format. The display interface of the data receive terminal may obtain the first image data in an RGB format sent by the data transmit terminal. Because the first image data includes image data information of the target image, the data receive terminal may obtain the ARGB data of the target image by performing data restoration processing on the first image data, so that the data receive terminal can obtain data in an ARGB format.

Optionally, the processor 1010 is configured to calculate, for each first pixel based on the RGB value of the first pixel and the RGB value of the second pixel at the corresponding position of the first pixel, an ARGB value of a pixel that is in the target image and that is at a corresponding position of the first pixel.

In this embodiment of this disclosure, the first preset image and the second preset image are separately blended with the target image, and the ARGB value of the pixel that is in the target image and that corresponds to the first pixel may be accurately restored with reference to the RGB value of the first pixel and the RGB value of the second pixel that corresponds to the first pixel, thereby improving accuracy of restoring data of the target image.

Optionally, the processor 1010 is configured to: obtain a first parameter based on the RGB value of the first pixel, the RGB value of the second pixel at the corresponding position of the first pixel, and the second preset value; and determine, according to the first parameter and the preset color depth, a transparency of the pixel that is in the target image and that is at the corresponding position of the first pixel, and determine, according to the RGB value of the first pixel and the first parameter, an RGB value of the pixel that is in the target image and that is at the corresponding position of the first pixel.

In this embodiment of this disclosure, an ARGB value of each pixel in the target image can be quickly restored by using a restoration algorithm corresponding to a simple and general image blending algorithm, which is highly applicable and can save calculation resources.

Optionally, the processor 1010 is configured to: determine, for each fifth pixel based on the RGB value of the fifth pixel and an RGB value of at least one fifth target pixel in the third hybrid image, an ARGB value of a sixth target pixel that is in the target image and that is at a corresponding position of the fifth pixel, where the fifth target pixel is adjacent to the fifth pixel, and an RGB value of a pixel that is in the third preset image and that is at a corresponding position of the fifth target pixel is different from an RGB value of a pixel that is in the third preset image and that is at a corresponding position of the fifth pixel.

In this embodiment of this disclosure, ARGB data of a pixel that is in the target image and that corresponds to the fifth pixel may be restored by using the RGB data of the fifth pixel and the RGB data of the fifth target pixel, to restore data of the target image, thereby increasing transmission efficiency of the target image.

Optionally, the processor 1010 is configured to: calculate an average value of color values of target colors of all fifth target pixels, where the target color is any one of the following colors: red, green, and blue; obtain a second parameter based on each average value, the RGB value of the fifth pixel, and the fourth preset value; determine, according to the second parameter and the preset color depth, a transparency of the sixth target pixel that is in the target image and that is at the corresponding position of the fifth pixel; and determine, according to the RGB value of the fifth pixel and the second parameter, an RGB value of the sixth target pixel that is in the target image and that is at the corresponding position of the fifth pixel.

In this embodiment of this disclosure, an ARGB value of each pixel in the target image may be quickly restored based on a case that RGB values of adjacent pixels in the target image are the case and by using a restoration algorithm corresponding to a simple and general image blending algorithm, which is highly applicable and can save calculation resources.

Optionally, the processor 1010 is further configured to: in a case of determining that the sixth target pixel is an opaque pixel, determine a transparency of the sixth target pixel as the fourth preset value, and determine an RGB value of the sixth target pixel as an RGB value of the fifth pixel at the corresponding position of the sixth target pixel; in a case of determining that the sixth target pixel is a black translucent pixel, determine the RGB value of the sixth target pixel as the third preset value; in a case that a pixel position of the sixth target pixel corresponds to a pixel position of the third pixel, determine the transparency of the sixth target pixel based on the RGB value of the at least one fifth target pixel; and in a case that the pixel position of the sixth target pixel corresponds to a pixel position of the fourth pixel, determine the transparency of the sixth target pixel based on the RGB value of the fifth pixel at the corresponding position of the sixth target pixel.

In this embodiment of this disclosure, based on a category of the sixth pixel, the restored ARGB value of the sixth target pixel in the target image may be corrected, so that accuracy of an obtained ARGB value of a pixel in the target image is improved.

Optionally, the processor 1010 is further configured to: if it is determined that transparencies of eight adjacent pixels of the sixth target pixel in the target image are all the fourth preset value, determine that the sixth target pixel is an opaque pixel.

Optionally, the processor 1010 is further configured to: if it is determined that RGB values of the eight adjacent pixels of the sixth target pixel in the target image are all the third preset value, determine that the sixth target pixel is a black translucent pixel.

In this embodiment of this disclosure, a category of the sixth target pixel is determined based on the RGB values of the eight adjacent pixels of the sixth target pixel, so that the restored RGB value of the sixth target pixel can be verified, thereby improving accuracy of restoring ARGB data of the target image.

Optionally, the processor 1010 is further configured to: for the fifth pixel, in a case of determining that a sixth target pixel that is in the target image and that is at a corresponding position of the fifth pixel is an opaque pixel, determine an RGB value of the sixth target pixel as an RGB value of the fifth pixel, and determining a transparency of the sixth target pixel as the fourth preset value; for the fifth pixel, in a case of determining that the sixth target pixel that is in the target image and that is at the corresponding position of the fifth pixel is a black translucent pixel, determine the RGB value of the sixth target pixel as the third preset value; in a case that a pixel position of the fifth pixel corresponds to a pixel position of the third pixel, determine the transparency of the sixth target pixel based on an RGB value of at least one fifth target pixel; and in a case that the pixel position of the fifth pixel corresponds to a pixel position of the fourth pixel, determine the transparency of the sixth target pixel based on the RGB value of the fifth pixel at the corresponding position of the sixth target pixel, where the fifth target pixel is adjacent to the fifth pixel, and an RGB value of a pixel that is in the third preset image and that is at a corresponding position of the fifth target pixel is different from an RGB value of a pixel that is in the third preset image and that is at a corresponding position of the fifth pixel.

In this embodiment of this disclosure, the ARGB data of the sixth target pixel may be restored by using a data block category to which the sixth target pixel belongs (for example, a black translucent pixel or an opaque pixel), thereby improving accuracy of restoring the ARGB data of the sixth target pixel.

Optionally, the processor 1010 is further configured to: if it is determined that RGB values of eight adjacent pixels of the fifth pixel are equal, determine that the sixth target pixel that corresponds to the fifth pixel is an opaque pixel.

Optionally, the processor 1010 is further configured to: if it is determined that an RGB value of each seventh target pixel in the third hybrid image is the third preset value and that RGB values of all fifth target pixels are equal, determine that the sixth target pixel that is in the target image and that is at the corresponding position of the fifth pixel is a black translucent pixel, where the seventh target pixel is adjacent to the fifth pixel, and an RGB value of a pixel that is in the third preset image and that is at a corresponding position of the seventh target pixel is the same as an RGB value of a pixel that is in the third preset image and that is at a corresponding position of the fifth pixel.

In this embodiment of this disclosure, data block classification is performed on the sixth target pixel that corresponds to the fifth pixel in the third hybrid image based on the RGB value of each fifth pixel in the third hybrid image, and a data block category to which the sixth target pixel belongs (for example, a black translucent pixel or an opaque pixel) is used, thereby improving accuracy of restoring the ARGB data of the sixth target pixel.

It should be understood that, in this embodiment of this disclosure, the input unit 1004 may include a graphics processing unit (GPU) 10041 and a microphone 10042, and the graphics processing unit 10041 processes image data of a still picture or a video obtained by an image capture apparatus (such as a camera) in a video capture mode or an image capture mode. The display unit 1006 may include a display panel 10061. Optionally, the display panel 10061 may be configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. Another input device 10072 may include but is not limited to a physical keyboard, a functional button (such as a volume control button or a power on/off button), a trackball, a mouse, and a joystick. Details are not described herein. The memory 1009 may be configured to store a software program and various data, including but not limited to an application and an operating system. An application processor and a modem processor may be integrated into the processor 1010, the application processor mainly processes an operating system, a user interface, an application program, and the like, and the modem processor mainly processes wireless communication. It can be understood that, alternatively, the modem processor may not be integrated into the processor 1010.

An embodiment of this disclosure further provides a non-transitory readable storage medium. The non-transitory readable storage medium stores a program or an instruction, and when the program or the instruction is executed by a processor, the processes of the foregoing data processing method embodiment are implemented and a same technical effect can be achieved. To avoid repetition, details are not described herein again.

The processor is a processor in the electronic device in the foregoing embodiment. The non-transitory readable storage medium includes a non-transitory computer-readable storage medium, such as a computer read-only memory (ROM), a random access memory (RAM), a magnetic disk, or an optical disc.

An embodiment of this disclosure further provides a chip. The chip includes a processor and a communications interface, the communications interface is coupled to the processor, and the processor is configured to execute a program or an instruction to implement the processes of the foregoing data processing method embodiment, and a same technical effect can be achieved. To avoid repetition, details are not described herein again.

It should be understood that the chip mentioned in this embodiment of this disclosure may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this disclosure is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this disclosure essentially or the part contributing to the prior art may be implemented in a form of a software product. The computer software product is stored in a non-transitory storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this disclosure.

The embodiments of this disclosure are described above with reference to the accompanying drawings, but this disclosure is not limited to the above implementations, and the above implementations are only illustrative and not restrictive. Under the enlightenment of this disclosure, those of ordinary skill in the art can make many forms without departing from the purpose of this disclosure and the protection scope of the claims, all of which fall within the protection of this disclosure.

What is claimed is:

1. A data processing method, performed by an electronic device comprising a display interface, the method comprising:

receiving, through the display interface, first image data in an RGB format sent by a data transmit terminal, wherein the first image data is image data obtained after image blending is performed on ARGB data of a target image and image data of a preset background image, and the display interface is used to receive data in an RGB format; and performing data restoration processing on the first image data to obtain the ARGB data of the target image; wherein:

the preset background image comprises a first preset image and a second preset image, an RGB value of each pixel in the first preset image is a first preset value, an RGB value of each pixel in the second preset image is a second preset value, and the second preset value is determined based on a number of bits of a preset color depth;

the first image data comprises an RGB value of each first pixel in a first hybrid image and an RGB value of each second pixel in a second hybrid image; and the first hybrid image is an image obtained after image blending is performed on the target image and the first preset image, and the second hybrid image is an image obtained after image blending is performed on the target image and the second preset image; or the preset background image comprises a third preset image, a third pixel and a fourth pixel in the third preset image are disposed at intervals, an RGB value of the third pixel is a third preset value, and an RGB value of the fourth pixel is a fourth preset value, wherein the fourth preset value is determined based on a number of bits of a preset color depth; and the first image data comprises an RGB value of each fifth pixel in a third hybrid image, wherein the third hybrid image is an image obtained after image blending is performed on the target image and the third preset image.

2. The method according to claim 1, wherein an RGB value of a first pixel is data obtained after weighted summation is performed on an RGB value of a first target pixel in the target image and an RGB value of a second target pixel in the first preset image based on a first ratio; and an RGB value of a second pixel that is in the second hybrid image and that is at a corresponding position of the first pixel is data obtained after weighted summation is performed on the RGB value of the first target pixel and an RGB value of a third target pixel in the second preset image based on the first ratio, wherein the first target pixel is a pixel that is in the target image and that is at a corresponding position of the first pixel, the second target pixel is a pixel that is in the first preset image and that is at a corresponding position of the first target pixel, and the third target pixel is a pixel that is in the second preset image and that is at a corresponding position of the first target pixel; and the first ratio is a ratio of a transparency of the first target pixel to the preset color depth.

3. The method according to claim 1, wherein the performing data restoration processing on the first image data to obtain the ARGB data of the target image comprises:

calculating, for each first pixel based on an RGB value of a first pixel and an RGB value of a second pixel at the corresponding position of the first pixel, an ARGB value of a pixel that is in the target image and that is at a corresponding position of the first pixel.

4. The method according to claim 3, wherein the calculating, for each first pixel based on the RGB value of the first pixel and the RGB value of the second pixel at the corresponding position of the first pixel, the ARGB value of the pixel that is in the target image and that is at the corresponding position of the first pixel comprises:

obtaining a first parameter based on the RGB value of the first pixel, the RGB value of the second pixel at the corresponding position of the first pixel, and the second preset value; and determining, according to the first parameter and the preset color depth, a transparency of the pixel that is in the target image and that is at the corresponding position of the first pixel, and determining, according to the RGB value of the first pixel and the first parameter, an RGB value of the pixel that is in the target image and that is at the corresponding position of the first pixel.

5. The method according to claim 1, wherein an RGB value of a fifth pixel is obtained after weighted summation is performed, based on a second ratio, on an RGB value of a fourth target pixel in the target image and an RGB value of a pixel that is in the third preset image and that is at a corresponding position of the fifth pixel, wherein the fourth target pixel is a pixel that is in the target image and that is at a corresponding position of the fifth pixel, and the second ratio is a ratio of a transparency of the second target pixel to the preset color depth.

6. The method according to claim 1, wherein the performing data restoration processing on the first image data to obtain the ARGB data of the target image comprises:

determining, for each fifth pixel based on an RGB value of a fifth pixel and an RGB value of at least one fifth target pixel in the third hybrid image, an ARGB value of a sixth target pixel that is in the target image and that is at a corresponding position of the fifth pixel, wherein the fifth target pixel is adjacent to the fifth pixel, and an RGB value of a pixel that is in the third preset image and that is at a corresponding position of the fifth target pixel is different from an RGB value of a pixel that is in the third preset image and that is at a corresponding position of the fifth pixel.

7. The method according to claim 6, wherein the determining, based on the RGB value of the fifth pixel and the RGB value of at least one fifth target pixel in the third hybrid image, the ARGB value of the sixth target pixel that is in the target image and that is at the corresponding position of the fifth pixel comprises:

calculating an average value of color values of target colors of all fifth target pixels, wherein a target color is any one of following colors: red, green, and blue;

obtaining a second parameter based on each average value, the RGB value of the fifth pixel, and the fourth preset value;

determining, according to the second parameter and the preset color depth, a transparency of the sixth target pixel that is in the target image and that is at the corresponding position of the fifth pixel; and determining, according to the RGB value of the fifth pixel and the second parameter, an RGB value of the sixth target pixel that is in the target image and that is at the corresponding position of the fifth pixel.

8. The method according to claim 6, wherein the method further comprises:

in a case of determining that the sixth target pixel is an opaque pixel, determining a transparency of the sixth target pixel as the fourth preset value, and determining an RGB value of the sixth target pixel as an RGB value of the fifth pixel at a corresponding position of the sixth target pixel;

in a case of determining that the sixth target pixel is a black translucent pixel, determining the RGB value of the sixth target pixel as the third preset value;

in a case that a pixel position of the sixth target pixel corresponds to a pixel position of the third pixel, determining the transparency of the sixth target pixel based on the RGB value of the at least one fifth target pixel; and in a case that the pixel position of the sixth target pixel corresponds to a pixel position of the fourth pixel, determining the transparency of the sixth target pixel based on the RGB value of the fifth pixel at the corresponding position of the sixth target pixel.

9. The method according to claim 8, wherein the determining that the sixth target pixel is the opaque pixel comprises:

if it is determined that transparencies of eight adjacent pixels of the sixth target pixel in the target image are all the fourth preset value, determining that the sixth target pixel is the opaque pixel; and the determining that the sixth target pixel is the black translucent pixel comprises:

if it is determined that RGB values of the eight adjacent pixels of the sixth target pixel in the target image are all the third preset value, determining that the sixth target pixel is the black translucent pixel.

10. The method according to claim 1, wherein the performing data restoration processing on the first image data to obtain the ARGB data of the target image comprises:

for the fifth pixel, in a case of determining that a sixth target pixel that is in the target image and that is at a corresponding position of the fifth pixel is an opaque pixel, determining an RGB value of the sixth target pixel as an RGB value of the fifth pixel, and determining a transparency of the sixth target pixel as the fourth preset value;

for the fifth pixel, in a case of determining that the sixth target pixel that is in the target image and that is at the corresponding position of the fifth pixel is a black translucent pixel, determining the RGB value of the sixth target pixel as the third preset value;

in a case that a pixel position of the fifth pixel corresponds to a pixel position of the third pixel, determining the transparency of the sixth target pixel based on an RGB value of at least one fifth target pixel; and in a case that the pixel position of the fifth pixel corresponds to a pixel position of the fourth pixel, determining the transparency of the sixth target pixel based on the RGB value of the fifth pixel at the corresponding position of the sixth target pixel, wherein the fifth target pixel is adjacent to the fifth pixel, and an RGB value of a pixel that is in the third preset image and that is at a corresponding position of the fifth target pixel is different from an RGB value of a pixel that is in the third preset image and that is at a corresponding position of the fifth pixel.

11. The method according to claim 10, wherein the determining that the sixth target pixel that is in the target image and that is at the corresponding position of the fifth pixel is the opaque pixel comprises:

if it is determined that RGB values of eight adjacent pixels of the fifth pixel are equal, determining that the sixth target pixel at the corresponding position of the fifth pixel is the opaque pixel; and the determining that the sixth target pixel that is in the target image and that is at the corresponding position of the fifth pixel is the black translucent pixel comprises:

if it is determined that an RGB value of each seventh target pixel in the third hybrid image is the third preset value and that RGB values of all fifth target pixels are equal, determining that the sixth target pixel that is in the target image and that is at the corresponding position of the fifth pixel is the black translucent pixel, wherein the seventh target pixel is adjacent to the fifth pixel, and an RGB value of a pixel that is in the third preset image and that is at a corresponding position of the seventh target pixel is the same as an RGB value of a pixel that is in the third preset image and that is at a corresponding position of the fifth pixel.

12. An electronic device, comprising a processor, a memory, and a program or an instruction that is stored in the memory and executable on the processor, wherein the program or the instruction, when executed by the processor, causes the electronic device to perform:

receiving, through a display interface, first image data in an RGB format sent by a data transmit terminal, wherein the first image data is image data obtained after image blending is performed on ARGB data of a target image and image data of a preset background image, and the display interface is used to receive data in an RGB format; and performing data restoration processing on the first image data to obtain the ARGB data of the target image;

wherein:

the preset background image comprises a first preset image and a second preset image, an RGB value of each pixel in the first preset image is a first preset value, an RGB value of each pixel in the second preset image is a second preset value, and the second preset value is determined based on a number of bits of a preset color depth;

the first image data comprises an RGB value of each first pixel in a first hybrid image and an RGB value of each second pixel in a second hybrid image; and the first hybrid image is an image obtained after image blending is performed on the target image and the first preset image, and the second hybrid image is an image obtained after image blending is performed on the target image and the second preset image; or the preset background image comprises a third preset image, a third pixel and a fourth pixel in the third preset image are disposed at intervals, an RGB value of the third pixel is a third preset value, and an RGB value of the fourth pixel is a fourth preset value, wherein the fourth preset value is determined based on a number of bits of a preset color depth; and the first image data comprises an RGB value of each fifth pixel in a third hybrid image, wherein the third hybrid image is an image obtained after image blending is performed on the target image and the third preset image.

13. The electronic device according to claim 12, wherein an RGB value of a first pixel is data obtained after weighted summation is performed on an RGB value of a first target pixel in the target image and an RGB value of a second target pixel in the first preset image based on a first ratio; and an RGB value of a second pixel that is in the second hybrid image and that is at a corresponding position of the first pixel is data obtained after weighted summation is performed on the RGB value of the first target pixel and an RGB value of a third target pixel in the second preset image based on the first ratio, wherein the first target pixel is a pixel that is in the target image and that is at a corresponding position of the first pixel, the second target pixel is a pixel that is in the first preset image and that is at a corresponding position of the first target pixel, and the third target pixel is a pixel that is in the second preset image and that is at a corresponding position of the first target pixel; and the first ratio is a ratio of a transparency of the first target pixel to the preset color depth.

14. The electronic device according to claim 12, wherein the program or the instruction, when executed by the processor, causes the electronic device to perform:

calculating, for each first pixel based on an RGB value of a first pixel and an RGB value of a second pixel at the corresponding position of the first pixel, an ARGB value of a pixel that is in the target image and that is at a corresponding position of the first pixel.

15. The electronic device according to claim 14, wherein the program or the instruction, when executed by the processor, causes the electronic device to perform:

obtaining a first parameter based on the RGB value of the first pixel, the RGB value of the second pixel at the corresponding position of the first pixel, and the second preset value; and determining, according to the first parameter and the preset color depth, a transparency of the pixel that is in the target image and that is at the corresponding position of the first pixel, and determining, according to the RGB value of the first pixel and the first parameter, an RGB value of the pixel that is in the target image and that is at the corresponding position of the first pixel.

16. The electronic device according to claim 12, wherein an RGB value of a fifth pixel is obtained after weighted summation is performed, based on a second ratio, on an RGB value of a fourth target pixel in the target image and an RGB value of a pixel that is in the third preset image and that is at a corresponding position of the fifth pixel, wherein the fourth target pixel is a pixel that is in the target image and that is at a corresponding position of the fifth pixel, and the second ratio is a ratio of a transparency of the second target pixel to the preset color depth.

17. The electronic device according to claim 12, wherein the program or the instruction, when executed by the processor, causes the electronic device to perform:

determining, for each fifth pixel based on an RGB value of a fifth pixel and an RGB value of at least one fifth target pixel in the third hybrid image, an ARGB value of a sixth target pixel that is in the target image and that is at a corresponding position of the fifth pixel, wherein the fifth target pixel is adjacent to the fifth pixel, and an RGB value of a pixel that is in the third preset image and that is at a corresponding position of the fifth target pixel is different from an RGB value of a pixel that is in the third preset image and that is at a corresponding position of the fifth pixel.

18. The electronic device according to claim 17, wherein the program or the instruction, when executed by the processor, causes the electronic device to perform:

calculating an average value of color values of target colors of all fifth target pixels, wherein a target color is any one of following colors: red, green, and blue;

obtaining a second parameter based on each average value, the RGB value of the fifth pixel, and the fourth preset value;

determining, according to the second parameter and the preset color depth, a transparency of the sixth target pixel that is in the target image and that is at the corresponding position of the fifth pixel; and determining, according to the RGB value of the fifth pixel and the second parameter, an RGB value of the sixth target pixel that is in the target image and that is at the corresponding position of the fifth pixel.

19. The electronic device according to claim 17, wherein the program or the instruction, when executed by the processor, causes the electronic device to further perform:

in a case of determining that the sixth target pixel is an opaque pixel, determining a transparency of the sixth target pixel as the fourth preset value, and determining an RGB value of the sixth target pixel as an RGB value of the fifth pixel at a corresponding position of the sixth target pixel;

in a case of determining that the sixth target pixel is a black translucent pixel, determining the RGB value of the sixth target pixel as the third preset value;

in a case that a pixel position of the sixth target pixel corresponds to a pixel position of the third pixel, determining the transparency of the sixth target pixel based on the RGB value of the at least one fifth target pixel; and in a case that the pixel position of the sixth target pixel corresponds to a pixel position of the fourth pixel, determining the transparency of the sixth target pixel based on the RGB value of the fifth pixel at the corresponding position of the sixth target pixel.

20. The electronic device according to claim 12, wherein the program or the instruction, when executed by the processor, causes the electronic device to perform:

for the fifth pixel, in a case of determining that a sixth target pixel that is in the target image and that is at a corresponding position of the fifth pixel is an opaque pixel, determining an RGB value of the sixth target pixel as an RGB value of the fifth pixel, and determining a transparency of the sixth target pixel as the fourth preset value;

for the fifth pixel, in a case of determining that the sixth target pixel that is in the target image and that is at the corresponding position of the fifth pixel is a black translucent pixel, determining the RGB value of the sixth target pixel as the third preset value;

in a case that a pixel position of the fifth pixel corresponds to a pixel position of the third pixel, determining the transparency of the sixth target pixel based on an RGB value of at least one fifth target pixel; and in a case that the pixel position of the fifth pixel corresponds to a pixel position of the fourth pixel, determining the transparency of the sixth target pixel based on the RGB value of the fifth pixel at the corresponding position of the sixth target pixel, wherein the fifth target pixel is adjacent to the fifth pixel, and an RGB value of a pixel that is in the third preset image and that is at a corresponding position of the fifth target pixel is different from an RGB value of a pixel that is in the third preset image and that is at a corresponding position of the fifth pixel.

\* \* \* \* \*